United States Patent [19]

Bowers et al.

[11] Patent Number: 4,815,124
[45] Date of Patent: Mar. 21, 1989

[54] DX CIRCUIT

[75] Inventors: Blaine T. Bowers, Naperville; Wayne E. Walters, Aurora, both of Ill.

[73] Assignee: Tellabs, Inc., Lisle, Ill.

[21] Appl. No.: 66,606

[22] Filed: Jun. 26, 1987

[51] Int. Cl.$^4$ ............................................. H04M 7/06
[52] U.S. Cl. ................................... 379/237; 379/236; 379/240
[58] Field of Search ............... 379/229, 236, 237, 240, 379/380, 381, 377, 385, 386; 370/24, 28, 27

[56] References Cited

U.S. PATENT DOCUMENTS 3,508,008  4/1970  Gardner et al. .................... 379/236
3,894,192  7/1975  Wisotzky ........................... 379/380
4,476,557  10/1984 Knoedl, Jr. ...................... 379/381 X

OTHER PUBLICATIONS

"Basic Telephone Switching Systems", D. Talley, Hayden Book Company, New Jersey, 1979, p. 41–45.

Primary Examiner—Jin F. Ng
Assistant Examiner—Randall S. Vaas
Attorney, Agent, or Firm—Juettner Pyle Lloyd & Verbeck

[57] ABSTRACT

An improved DX circuit may be connected to signaling and reference leads of a DX signaling link, without need to balance the internal impedance of the DX circuit against that of the external DX signaling link. The DX circuit senses the magnitude and direction of current flow on the leads, and operates on the principle that when a near end signaling circuit is on-hook, a positive current flow indicates that a far end signaling circuit is off-hook and a current flow of zero indicates that it is on-hook, while if the near end signaling circuit is off-hook, a negative current flow indicates that the far end signaling circuit is on-hook and a current flow of zero indicates that it is off-hook. The arrangement allows the DX circuit to properly function irrespective of the resistive load presented by the DX signaling link. To enable the DX circuit to function with various capacitive loads, it also detects the rate of change of current on the leads and, in the absence of a change in status of the near end signaling circuit, provides an output representative of a change in the on-hook/off-hook status of the far end signaling circuit, immediately upon detecting a sufficient rate of change.

19 Claims, 2 Drawing Sheets

DX CIRCUIT

BACKGROUND OF THE INVENTION

The present invention relates to DX circuits in general, and in particular to an improved DX circuit that may be connected to reference and signaling leads of a DX signaling link, without need to balance the internal impedance of the DX circuit against that of the external signaling link.

One common method for trunk signaling, between central office or PBX switches, uses E & M signaling leads, which allows for simultaneous two-way or duplex signaling between offices. The E & M signaling interface provides a standard interface between a variety of switches, for example between trunks and signaling units or between signaling units themselves. E & M signaling conveys supervisory and dial address information to a switching device using two control leads (E & M), and both ends of the circuit use compatible signaling units.

E & M signaling ranges are relatively short, so to extend this type of duplex signaling over any reasonable distance, it is necessary to use DX circuits. Conventionally, a DX signaling circuit uses a series of relay windings to convert E & M signaling to DX signaling, and two separate leads, a signaling lead and a reference lead, to indicate the E & M states on either side of the circuit. DX circuits can be used on 2 Wire or 4 Wire facilities, and are installed on trunk lines or carrier facilities that connect PBXs to central offices or central offices to central offices. Two DX circuits are used in any application to convert E & M signaling to DX signaling at each end of the circuit. In cases where DX circuit outputs are connected directly to line amplifiers, they are connected via center-tapped simplex leads. In 2 Wire applications, they are connected via A and B leads.

A pair of conventional DX signaling units is a balanced bridge. As such, each must be resistively balanced against the resistance of the signaling loop, plus the internal resistance of the unit itself. In 2 Wire applications, signaling loop[resistance is simply the resistance of the metallic facility between the DX signaling units. In 4 Wire applications, where signaling takes place over simplex leads of transmit and receive pairs, signaling loop resistance is equal to one-half of the loop resistance of either pair, i.e., the simplex loop resistance of the transmit and receive pair. The DX signaling unit therefore has an internal resistive balance network, which may be adjusted to provide a selected amount of resistance across the unit's outputs.

Conventional DX circuits must also be balanced for facility capacitance. No specific formula exists for calculating the amount of capacitance required to properly balance the circuit. The amount depends upon a variety of factors. For example, little capacitive balance is required in most 4 Wire DX circuits because the signaling pairs are separated by relatively substantial distances, and are therefore coupled by very little mutual capacitance. Numerous other factors, including cable gauge and splicing format, also affect DX signaling link capacitance. The cumulative effect of these factors makes prediction of the required amount of balancing capacitance difficult. A trial-and-error procedure is therefore necessary to achieve proper capacitive balance by means of capacitors that may be switched into the DX circuit balance network.

Unless a DX signaling unit's internal impedance is balanced against that of the external DX signaling link, the unit may not operate properly. Proper DX balance ensures optimum performance of the DX signaling unit for a specific length of a DX signaling link, and also minimizes pulse distortion. Unfortunately, proper DX balance is often very difficult to achieve.

OBJECT OF THE INVENTION

The primary object of the invention is to provide an improved DX circuit that will operate properly without need to balance its internal DX impedance against the impedance of an external DX signaling link to which it is connected.

SUMMARY OF THE INVENTION

In accordance with the present invention, there is provided a DX circuit for connection between E and M leads of a signaling circuit and signaling and reference leads at one end of a DX signaling link to convert E and M signaling to DX signaling, and vice versa, wherein DX signals are introduced onto a distant end of the signaling link in response to E and M signaling at the distant end. The DX circuit comprises a status detector for sensing the value of a signal on one of the E and M leads and for generating and applying a first or a second voltage, across the signaling and reference leads, in accordance with the signal value indicating an off-hook or an on-hook status, respectively, of the signaling circuit at the one end. A current detector senses the magnitudes and polarities of current flows on the signaling and reference leads, and generates a control voltage having a value in accordance with the difference between the current flows. Also included is output circuit means, coupled with the status and current detectors, for generating and applying onto the other of the E and M leads an output signal having a first or a second state, in accordance with the values of the control voltage and the voltage generated by the status detector, to indicate an off-hook or an on-hook status, respectively, of a signaling circuit at the distant end.

The invention also contemplates a method of converting E and M signaling to DX signaling, and vice versa. The method comprises the steps of sensing the value of a signal on one of a pair of E and M leads, and applying across signaling and reference leads either a first or a second voltage in accordance with the signal having a first or a second value, respectively. Also included are the steps of sensing the magnitudes and polarities of current flows on the signaling and reference leads, generating a control voltage having a value in accordance with the difference between the current flows, and applying on the other of the E and M leads a signal having either a first or a second state, in accordance with the value of the signal on the one of the E and M leads and the value of the control voltage.

The foregoing and other objects, advantages and features of the invention will become apparent upon a consideration of the following detailed description, when taken in conjunction with the accompanying drawings.

DETAILED DESCRIPTION

Prior Art

Figure 1:
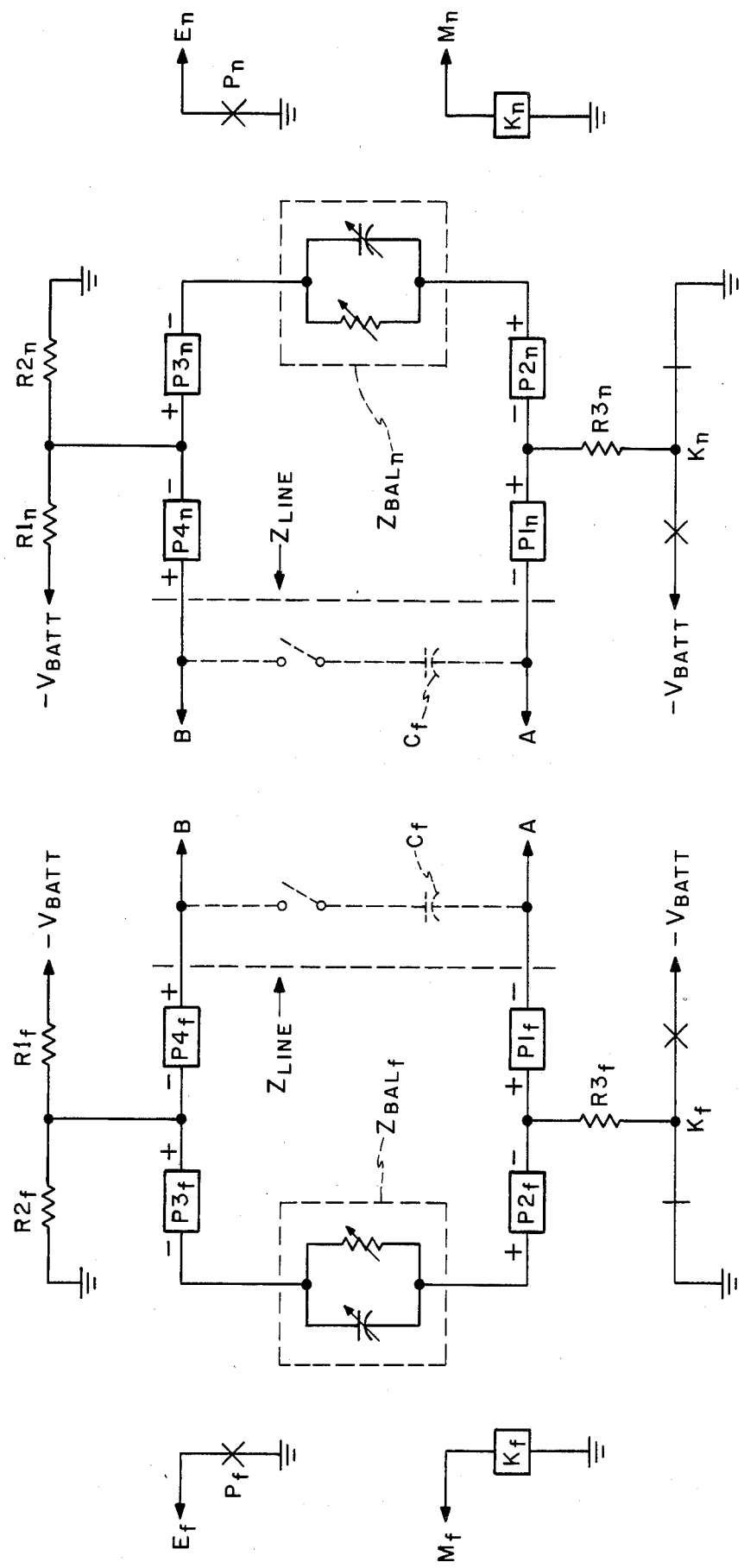
FIG. 1 is a schematic illustration of a pair of conventional and identical DX signaling circuits of a type contemplated by the prior art.

FIG. 1 shows a pair of identical and conventional DX circuits of a type contemplated by the prior art, one at each of the near and far ends of a DX signaling link. A pair of DX circuits are shown, since to convert E & M signaling to DX signaling and back again, two are required. The signaling link illustrated is a 2 Wire circuit, so the outputs from the DX circuits are connected to A and B leads, although the signaling link could just as readily be a 4 Wire circuit, in which case the outputs would be connected to simplex leads. To identify the DX circuit at the far end of the link, a subscript "f" is used in denoting its components, while for the near end DX circuit a subscript "n" is used.

Considering the DX circuit at the near end of the DX signaling link, for the particular connection to E and M leads as shown and it being understood that a similar description applies to the one at the far end, it includes a $P_n$ relay comprising four series connected windings $P1_n$-$P4_n$ for controlling a contact $P_n$ in series between ground and a near end E lead $E_n$. A relay $K_n$ is in series between ground and a near end M lead $M_n$, and controls the states of a pair of contacts $K_n$ in series between ground and negative battery, which usually is −48V. A resistor $R3_n$ is between the juncture of the contacts $K_n$ and the juncture of the relay windings $P1_n$ and $P2_n$, and a pair of resistors $R1_n$ and $R2_n$, in series between ground and negative battery, provide a reference voltage equal to 40 percent of battery voltage, or about −19.2 V, at the juncture of the relay windings $P3_n$ and $P4_n$.

The pair of DX signaling circuits form a balanced bridge, so the internal impedance of each must be balanced against that of the external DX signaling link. The near end DX circuit therefore includes a DX balance impedance $Z_{baln}$, consisting of an adjustable resistor and capacitor, in series between the relay windings $P2_n$ and $P3_n$. The relay winding $P4_n$ is connected to the B lead and the winding $P1_n$ to the A lead, and shown in dashed lines is a midpoint capacitor $C_n$, which optionally may be switched across the A and B leads. When proper DX balance is achieved, the value of the DX balance impedance $Z_{baln}$ substantially matches the external DX signaling link impedance $Z_{line}$ looking into the A and B leads, so that $Z_{baln}/2$ is substantially equal to the impedance of line A. As is known, the B or reference lead exhibits a relatively constant voltage of about −19.2 V, and compensates for voltage differences between the near and far ends, whether caused by differences in battery supply or grounds between units, or by longitudinal voltage differences. On the other hand, the voltage on the A or signaling lead varies as a result of changes in the idle/busy states of signaling circuits (not shown) connected to the E and M leads at each of the near and far ends, and indicates the on-hook/off-hook status of the signal circuits.

The "+"and "−"symbols, on opposite sides of the windings $P1_n$-$P4_n$, indicate the direction of current flow through the windings required to pick up the $P_n$ relay and close its contact, the required direction being from + to −. However, it is not the current flow through any individual one of the windings, but instead it is the sum total of the currents flowing through all of the windings, taking into consideration the direction or polarity of the current flows, that determines whether the relay picks up. Unless the sum total of currents is sufficiently positive, the relay will be released and its contact $P_n$ will be open. Normally, if the DX balance impedance is properly adjusted, unless there is a longitudinal imbalance, or differences in battery supply voltages or grounds across the DX signaling link, no current flows through the windings $P4_n$.

In operation of the near end DX circuit, with each of the near and far end signaling circuits on-hook, a ground exists on each of the M leads $M_n$ and $M_f$, the relays $K_n$ and $K_f$ are released, the current flow through each of the relay windings $P1_n$ and $P4_n$ is zero, and the current flow through each of the windings $P2_n$ and $P3_n$ is −19.2 V/$Z_{bal}$. Under this condition, the sum total of currents flowing through the near end relay windings is −38.4 V/$Z_{bal}$, so the relay is not picked up and the relay contact $P_n$ is open.

Upon the far end going off-hook and applying negative battery to the lead $M_f$ to change the state of the relay contacts $K_f$, while the near end remains on-hook, the current flow through the relay winding $P1_n$ is 48 V/($Z_{bal}$/2), the flow through each of the relay windings $P2_n$ and $P3_n$ is −19.2 V/$Z_{bal}$, and the flow through the relay winding $P4_n$ is zero. Under this circumstance, the sum total of current flows through the relay windings is a positive 57.6 V/$Z_{bal}$, causing the relay to pick up and close the contact $P_n$ to apply ground onto the lead $E_n$.

For the case where the near end goes off-hook and applies negative battery to the lead $M_n$ to change the state of the contacts $K_n$, while the far end remains on-hook, the current flow through the winding $P1_n$ is −48 V/($Z_{bal}$/2), the flow through each of the windings $P2_n$ and $P3_n$ is 38.8 V/$Z_{bal}$, and the flow through the winding $P4_n$ is zero. The sum total of current flows through the windings is therefore −38.4 V/$Z_{bal}$, the relay is not picked up and its contact $P_n$ remains open.

Should both the near and far ends be off-hook, so that negative battery is on each of the leads $M_n$ and $M_f$, the states of both sets of relay contacts $K_n$ and $K_f$ are changed. The current flow through each of the relay windings $P1_n$ and $P4_n$ is then zero, the flow through each of the windings $P2_n$ and $P3_n$ is 28.8 V/$Z_{bal}$, the sum total of current flows through the windings is 57.6 V/$Z_{bal}$, and the relay is picked up and its contact $P_n$ is closed.

Thus, whenever the far end signaling circuit is on-hook, irrespective of whether the near end signaling circuit is on-hook or off-hook, the DX signaling between the far and near ends causes the $P_n$ relay of the near end DX circuit to maintain its contact $P_n$ open. On the other hand, whenever the far end is off-hook, irrespective of whether the near end is on-hook or off-hook, the DX signaling between the far and near ends causes the near end DX circuit to pick up and close the contact $P_n$. A similar analysis may be applied to the far end DX circuit. In general, negative battery on the M lead at either the near or far end picks up the P relay and its contact at the opposite end, so that $P_n$ follows $K_f$, and vice versa. In this manner, signals on the M lead at one end are reflected on the E lead at the opposite end. It is understood, of course, that for either the near or far end the on-hook/off-hook status of the signalling circuit at that end could just as readily be presented on the E lead, such that signals representative of the on-hook/off-hook status of the signaling circuit at the opposite end would then be on the M lead. Thus, the lead designated "$E_n$" at the near end could be labeled "$M_n$", and vice versa.

As mentioned, the pair of DX circuits form a balanced bridge. Therefore, the DX balance impedances $Z_{bal}$ must be adjusted to balance each DX circuit's internal impedance against that of the external DX signaling link. Unless the internal impedances are balanced to within about 25-35% of the impedance of the external DX signaling link, pulse distortion may occur and the DX circuits may not operate properly. However, proper DX balance is often difficult to achieve.

THE INVENTION

Figure 2:
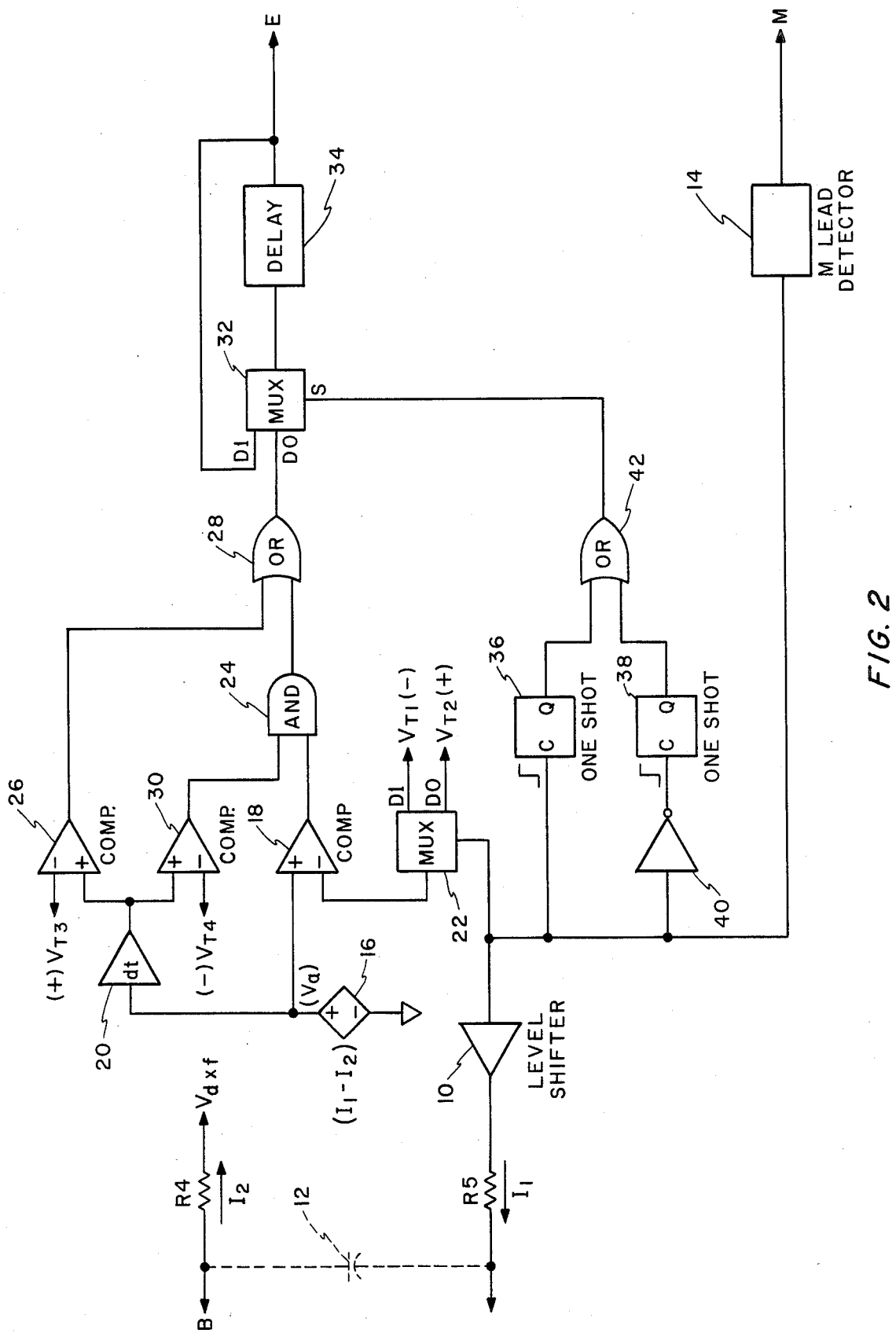
FIG. 2 is a schematic illustration of an improved DX signaling circuit, according to the teachings of the present invention.

In improving upon the prior art, the DX circuit of the invention, as shown in FIG. 2, may be connected to signaling and reference leads A and B of a DX signaling link, without need to balance the internal impedance of the DX circuit against that of the external signaling link. The DX circuit senses the magnitude and direction of current flows on the A and B leads, subtracts one from the other and operates on the principle that when the near end signaling circuit (not shown) is on-hook, a positive difference between the current flows indicates that the far end signaling circuit (not shown) is off-hook; when the near end is off-hook, a negative difference between the current flows indicates that the far end is on-hook; and when the difference between the current flows is zero, the on-hook/off-hook status at each of the near and far ends is the same. The arrangement allows the DX circuit to properly function when connected to the signaling link, irrespective of the resistive load presented by the link. To accommodate proper operation of the DX circuit with various capacitive loads presented by the signaling link, it also detects the rate of change of the difference between the current flows on the A and B leads. Upon detecting a sufficient rate of change in the absence of a change in the on-hook/off-hook status of the near end signaling circuit, it substantially immediately provides on the E lead a signal representative of a change in the on-hook/off-hook status of the far end signaling circuit. Although only one DX circuit is shown, it is understood that a DX circuit would also be at the opposite end of the signaling link.

Considering the DX circuit as being at the near end of the signaling link, it has a resistor R4, through which a voltage $V_{dxf}$ is applied to the B or reference lead. The voltage is the same as is provided by the conventional DX circuit, i.e., $-19.2$ V. It also has a resistor R5, through which an output signal from a level shifter 10 is applied to the A or signaling lead. A capacitor 12, shown in dashed lines between the A and B leads, represents the capacitive portion of the DX signaling link impedance, it being understood that the DX signaling link also has resistance. In essence, the resistor R4 replaces the resistances of the relay winding $P4_n$ and the resistors $R1_n$ and $R2_n$ of the conventional DX circuit, the resistor R5 replaces the resistances of the relay winding $P1_n$ and the resistor $R3_n$, and the level shifter 10, which may be a relay or push-pull transistor pair, replaces the contacts $K_n$.

A near end on-hook/off-hook status detector, comprising an M lead detector 14, has an input connected to the M lead, and provides at its output a "1" state in response to negative battery or $-48$ V on the lead, which represents an off-hook status of the near end signaling circuit, and a "0" state in response to ground on the lead, which represents an on-hook condition of the near end. The output from the detector is applied as an input to the level shifter 10, which generates at its output a ground in response to a 0 state at its input and $-48$ V in response to a 1 state. Signals representative of the on-hook/off-hook status of the near end signaling circuit are therefore transmitted over the A lead to the far end signaling circuit.

A current-to-voltage converter 16 senses the magnitudes and polarities (as indicated by arrows) of a current $I_1$ through the resistor R5 and a current $I_2$ through the resistor R4, subtracts $I_2$ from $I_1$ and generates at its output a voltage $V_a$ having a magnitude and polarity representative of the difference between the current flows. Normally, the DX signaling link is longitudinally balanced, so the current $I_2$ is zero and the voltage $V_a$ has a magnitude and polarity directly in accordance with the magnitude and polarity of the current $I_1$ on the A lead. Should there be longitudinal voltage imbalance on the signaling link, the current $I_2$ will not be zero, but the current $I_1$ will reflect the value of $I_2$, and the changes in the current flows will cancel out in the subtraction process. In any event, the converter output voltage $V_a$ is applied to a noninverting input to an operational amplifier or comparator 18 and to an input to a differentiating circuit 20. The voltage $V_a$ is V, e.g. 0V or ground when both the near and far end signaling circuits are simultaneously on-hook or off-hook ($I_{1-I2}=0$), is greater than V($>$V), e.g. +V when the near end is on-hook and the far end is off-hook ($I_{1-I2}$ is positive), and is less than V($<$V), e.g. $-$V when the near end is off-hook and the far end is on-hook ($I_{1-I2}$ is negative).

The output from the M lead detector 14 also is applied to a control input S of a multiplexer 22 having an input D1 connected to a threshold voltage $V_{t1}$ and an input D0 connected to a threshold voltage $V_{t2}$. A 0 state at the control input S connects the input D0 to an output from the multiplexer, while a 1 state at the control input connects the input D1 to the output. The voltage $V_{t1}$ is negative but less negative than the output voltage $-$V from the current-to-voltage converter 16 under steady state conditions when the near end is off-hook and the far end is on-hook and the voltage $V_{t2}$ is positive but less positive than the output voltage $+$V from the current-to-voltage converter 16 under steady state conditions when the near end is on-hook and the far end is off-hook. The output from the multiplexer is applied to an inverting input of the comparator op amp 18, the output from which, during a steady state of the signal on the DX signaling link, represents the near end contact $P_n$ of a prior DX circuit. A 0 state at the op amp output indicates that the "$P_n$ contact" is open and the far end signaling circuit is on-hook, a 1 state represents that the "$P_n$ contact" is closed and the far end is off-hook, and the output is applied to one input of an AND gate 24.

Because of the capacitance exhibited by the DX signaling link and any midpoint capacitance, when the far end signaling circuit changes on-hook/off-hook status, an exponentially decaying DX signal is transmitted to the near end, but the comparator 18 does not immediately respond to the signal. Instead, it indicates a change in far end status only after the output voltage $V_a$ from the converter 16 reaches a value representative of a substantially steady state condition of the currents $I_1$ and $I_2$, as determined by the threshold voltage $V_{t1}$ or $V_{t2}$ then being applied to the inverting input of the op amp. Therefore, to enable the DX circuit to function with capacitive loads and substantially immediately generate on the E lead an indication of a change in the on-hook/off-hook status of the far end, the differentiating circuit 20 has been provided to sense transitions in the voltage $V_a$. The output from the differentiating circuit is applied to a noninverting input of a comparator op amp 26, the output from which provides a first input to an OR gate 28, a second input of which receives the output from the AND gate 24. The differentiating circuit output also is applied to a noninverting input of a second comparator op amp 30, the output from which provides a second input to the AND gate. Coupled to respective inverting inputs of the op amps 26 and 30 are threshold voltages $V_{t3}$ and $V_{t4}$. $V_{t3}$ is slightly positive with respect to ground but well less positive than the output voltage $+V$ from the current-to-voltage converter 16 under steady state conditions and $V_{t4}$ slightly negative but well less negative than that of the output voltage V from the converter 16 under steady state conditions. During a steady state of the DX signal, the output from the differentiating circuit is at OV or ground, but becomes positive in response to positive going transitions in the voltage $V_a$ and negative in response to negative going transitions.

Upon the far end signaling circuit going from on-hook to off-hook, irrespective of whether the near end is on-hook or off-hook, a positive going transition occurs in the voltage $V_a$ from the current-to-voltage converter 16. The transition is sensed by the differentiating circuit 20, the output from which substantially immediately goes positive and causes the op amp 26 to apply a 1 state to and through the OR gate 28 and the op amp 30 a 1 state to the AND gate 24. The 1 state at the output from the OR gate represents an off-hook condition of the far end, and the output is maintained at the 1 state by the differentiating circuit until the voltage $V_a$ from the current-to-voltage converter increases sufficiently, to a value more positive than whichever of the threshold voltages $V_{t1}$ or $V_{t2}$ is at the inverting input of the comparator 18, to cause the comparator to apply a 1 state to and through the AND gate and OR gate. Since the voltage $V_{t4}$ is slightly negative, absent changes in the status of the near end signaling circuit a 1 state continues to be maintained at the AND gate output, and therefore at the OR gate output, after the output from the differentiating circuit returns to ground and for as long as the far end remains off-hook.

When the far end signaling circuit goes from off-hook to on-hook, irrespective of the on-hook/off-hook status of the near end, a negative going transition occurs in the output voltage $V_a$ from the current-to-voltage converter 16. The transition is sensed by the differentiating circuit 20, the output from which substantially immediately goes negative to cause the op amps 26 and 30 to apply a 0 state to each of the AND gate 24 and OR gate 28. This generates a 0 state at the output from the OR gate to indicate that the far end is on-hook. The differentiating circuit then maintains the 0 state at the OR gate output for a time sufficient for the converter output voltage $V_a$ to decrease sufficiently, to a value less positive than whichever of the threshold voltages $V_{t1}$ $V_{t2}$ is at the inverting input of the comparator 18, to cause the comparator to apply a 0 state to and through the AND gate to hold the OR gate output at the 0 state. Since the voltage $V_{t3}$ is slightly positive, absent changes in the status of the near end signaling circuit a 0 state continues to be maintained at the OR gate output after the output from the differentiating circuit returns to ground and for as long as the far end remains on-hook.

The differentiating circuit 20 therefore eliminates pulsing distortion by substantially immediately switching the output from the OR gate 28 to a 0 state in response to a negative going transition in the output voltage $V_a$ from the current-to-voltage converter 16 when the far end signaling circuit goes on-hook, and to a 1 state in response to a positive going transition when the far end goes off-hook. In other words, upon a change in the on-hook/off-hook status of the far end, the differentiating circuit responds to the exponentially decaying waveform transmitted to the near end and causes the proper signal to substantially immediately appear at the OR gate output.

The output from the OR gate 28 is coupled through a multiplexer 32 and a delay circuit 34 to the E lead, to generate on the E lead a 1 or 0 state in accordance with the far end being off-hook or on-hook. The delay circuit introduces about a 10 millisecond delay in the signal from the OR gate, and functions as a debounce circuit to prevent short duration glitches on the DX signaling link from causing false far end state indications on the E lead.

Signals on the near end M lead change the output from the level shifter 10, and also cause changes in the current $I_1$ and transitions in the output voltage $V_a$ from the current-to-voltage converter 16. Means are therefore provided for preventing near end signaling circuit on-hook/off-hook status changes from being reflected on the near end E lead, so that the signal on the E lead does not indicate a false on-hook/off-hook status of the far end signaling circuit. The means includes a first one shot circuit 36 connected at its input to the output from the M lead detector 14, and a second one shot circuit 38 connected at its input to the output from the M lead detector through an inverting amplifier 40. Outputs from the one shot circuits are applied as inputs to an OR gate 42, an output from which connects to a control input S of the multiplexer 32. In response to a steady state at the output from the M lead detector, the output from the OR gate 42 is at a 0 state and controls the multiplexer to connect the signal at its controlled input D0 to and through the delay circuit 34, so that the output from the OR gate 28 appears on the E lead. However, in response to a change in state of the output signal from the M lead detector, the output from the OR gate 42 momentarily changes to a 1 state and controls the multiplexer to connect the signal at its controlled input D1 to and through the delay circuit. The output from the delay circuit is connected to the input D1, so the signal on the E lead is prevented from changing as a result of and during a transition in the output from the M lead detector, irrespective of whether the transition is from a 0 to a 1 state, or vice versa, and despite any changes in the output from the OR gate 28. The durations of the one shot circuits 36 and 38 are sufficiently long to allow the output from the OR gate 28 to return to a steady state condition following a change in status of the near end. Consequently, the signal on the near end E lead always accurately reflects the on-hook/off-hook status of the far end, and is not influenced by changes in the on-hook/off-hook status of the near end.

The invention therefore provides an improved DX circuit, the internal impedance of which need not be balanced against that of the external DX signaling link for proper operation. One stage of the DX circuit comprises a detector, including the current-to-voltage converter 16 and comparator 18, for detecting the on-hook/off-hook status of a signaling circuit at a distant end of the signaling link under steady state conditions. The detector allows the DX circuit to function properly in an environment of various resistive loads presented by the external signaling link, without need to balance the DX circuit's internal resistance against that of the link.

A second stage comprises a rate of change sensor, including the differentiating circuit 20. The rate of change sensor senses occurrence of an exponentially decaying waveform on the DX signaling link upon a change in on-hook/off-hook status of the far end signaling circuit, and substantially immediately forces the E lead to and holds the E lead at the proper state until a steady state DX signal is obtained, whereupon the detector stage maintains the state on the E lead. This stage also includes a debounce circuit to prevent short duration glitches on the signaling link from causing false far end status indications on the E lead, and enables the DX circuit to function properly in an environment of various capacitive loads presented by the external signaling link.

A third and last stage comprises a transmit inhibit means, which prevents transitions on the DX signaling link, caused by changes in the on-hook/off-hook status of the near end signaling circuit, from affecting the signal on the near end E lead. In other words, this stage prevents near end status changes from causing false indications of the on-hook/off-hook status of the far end.

As for the prior art circuit, it is understood that the on-hook/off-hook status of the near end signaling circuit need not be presented on the M lead, but instead could be signaled on the E lead. In such case, the DX circuit would still operate as described, although the lead labeled and described as "E" would then be the "M" lead, and vice versa.

While embodiments of the invention have been described in detail, various modifications and other embodiments thereof may be devised by one skilled in the art without departing from the spirit and scope of the invention, as defined in the appended claims.

What is claimed is:

1. A DX circuit for connection between E and M leads of a signaling circuit and a pair of leads at one end of a DX signaling link, to convert E and M signaling to DX signaling, and vice versa, wherein DX signals are introduced onto a distant end of the signaling link in response to E and M signaling at the distant end, said DX circuit comprising status detector means for sensing the value of a signal on one of the E and M leads of the one end signaling circuit and for generating and applying a status voltage, across the signaling link leads, having a value in accordance with the signal on the one of the E and M leads of the one end signaling circuit indicating an off-hook or an on-hook status of the one end signaling circuit; current detector means for sensing the magnitudes and polarities of current flows on the signaling link leads and for generating a control voltage having a value in accordance with the difference between the current flows; and output circuit means, coupled with said status detector means and said current detector means, for generating and applying onto the other of the E and M leads of the one end signaling circuit an output signal having a value in accordance with the values of said control and status voltages, to indicate an off-hook or an on-hook status of a signaling circuit at the distant end of the signaling link.

2. A DX circuit as in claim 1, wherein the pair of DX signaling link leads are signaling and reference leads, said current detector means subtracts the value of the current flow on the reference lead from the value of the current flow on the signaling lead, and said control voltage has a magnitude and polarity in accordance with the magnitude and polarity of the difference between the current flows.

3. A DX circuit as in claim 2, wherein said control voltage is substantially zero, positive or negative in accordance with the difference between the current flows being substantially zero, positive or negative, respectively.

4. A DX circuit as in claim 3, wherein said status voltage generated by said status detector means is a first or a second voltage in accordance with the signal on the one of the E and M leads of the one end signaling circuit indicating an off-hook or an on-hook status, respectively, of the one end signaling circuit; said output circuit means generates an output signal having a first state, indicating an off-hook status of the distant end signaling circuit, both when said control voltage is positive and said status detector means is generating said second voltage, and when said control voltage is substantially zero and said status detector means is generating said first voltage; and said output circuit means generates an output signal having a second state, indicating an on-hook status of the distant end signaling circuit, both when said control voltage is negative and said status detector means is generating said first voltage, and when said control voltage is substantially zero and said status detector means is generating said second voltage.

5. A DX circuit as in claim 1, wherein said status voltage generated by said status detector means is a first or a second voltage in accordance with the signal on the one of the E and M leads of the one end signaling circuit indicating an off-hook or an on-hook status, respectively, of the one end signaling circuit; said output circuit means, in response to said status detector means generating said second voltage, generates an output signal on the other of the E and M leads of the one end signaling circuit, having a second state, indicating an on-hook status of the distant end signaling circuit, when said current detector means control voltage has a selected value, and generates an output signal having a first state, indicating an off-hook status of the distant end signaling circuit, when said control voltage has a value that is greater than said selected value; and said output circuit means, in response to said status detector means generating said first voltage, generates an output signal having said first state when said control voltage has said selected value, and generates an output signal having said second state when said control voltage has a value that is less than said selected value.

6. A DX circuit as in claim 5, wherein said control voltage selected value is substantially zero.

7. A DX circuit as in claim 1, wherein the DX signaling link has resistance and capacitance, so that upon introduction of DX signals onto the distant end of the signaling link, the value of the difference between the current flows on the pair of signaling link leads at the one end of the signaling link changes in an exponential manner until a steady state is reached, and further including rate of change sensing means coupled with said current detector means and said output circuit means for sensing changes in the value of said control voltage and, upon sensing at least a selected rate of change in value of said control voltage while said status voltage remains substantially unchanged, for causing said output circuit means to change the value of its output signal to indicate a change in the on-hook/off-hook status of the distant end signaling circuit.

8. A DX circuit as in claim 7, wherein said status detector means status voltage is a first or a second voltage in accordance with the signal on the one of the E and M leads of the one end signaling circuit indicating an off-hook or an on-hook status, respectively, of the one end signaling circuit; during a steady state of current flows on the pair of DX signaling link leads said current detector means control voltage has either a first value, a second value greater than said first value, or a third value less than said first value, in accordance with the difference between the current flows being substantially zero, positive or negative, respectively; and said output circuit means includes means for establishing either a first threshold voltage, having a value intermediate said control voltage first and third values, when said status detector is generting said first voltage, or a second threshold voltage, having a value intermediate said control voltage first and second values, when said status detector is generating said second voltage, and means for comparing the value of said control voltage with the value of whichever of said first and second threshold voltages is established, said output circuit means being responsive to said control voltage and said threshold voltages to generate an output signal having a second state, indicating an on-hook status of the distant end signaling circuit, whenever said control voltage has a value less than the established threshold voltage, and an output signal having a first state, indicating an off-hook status of the distant end signaling circuit, whenever said control voltage has a value greater than the established threshold voltage.

9. A DX circuit as in claim 8, wherein said rate of change sensing means, upon occurrence of a change in value of said control voltage, causes said output circuit means to substantially immediately change the value of its output signal, and wherein said means for comparing then maintains the changed value of said output signal upon said control voltage changing from an initial value less than to a value greater than, or from an initial value greater than to a value less than, the value of the established threshold voltage.

10. A DX circuit as in claim 7, including inhibit means coupled with said status detector means and said output circuit means for preventing said output circuit means from changing the value of the signal on the other of the E and M leads of the one end signaling circuit in response to changes in value of said current detector means control voltage caused by changes in value of said status detector means status voltage.

11. A DX circuit for connection between E and M leads of a signaling circuit and a pair of leads at one end of a DX signaling link, to convert E and M signaling to DX signaling, and vice versa, wherein DX signals are introduced onto a distant end of the signaling link in response to E and M signaling at the distant end, said DX circuit comprising status detector means for connection with one of the E and M leads of the one end signaling circuit for sensing the on-hook/off-hook status of the one end signaling circuit and for generating and applying a first or a second voltage across the pair of signaling link leads in accordance with the status being off-hook or on-hook, respectively; a current-to-voltage converter for sensing the current flows on the pair of signaling link leads and for generating a control voltage having a value in accordance with the difference between the current flows; and output circuit means, coupled with said current-to-voltage converter and said status detector means, for applying onto the other of the E and M leads of the one end signaling circuit a signal having a first state when the value of said control voltage and the voltage being generated by said status detector means indicate that a signaling circuit at the distant end of the signaling link is off-hook, and a signal having a second state when the value of said control voltage and the voltage being generated by said status detector means indicate that the distant end signaling circuit is on-hook.

12. A DX circuit as in claim 11, wherein said current-to-voltage converter control voltage is about 0V when the on-hook/off-hook status of the one and distant end signaling circuits is the same, is a positive voltage (+V) with respect to 0V when the status of the one end signaling circuit is on-hook and of the distant end signaling circuit is off-hook, and is a negative voltage (−V) with respect to 0V when the status of the one end signaling circuit is off-hook and of the distant end signaling circuit is on-hook, and further including threshold circuit means coupled with said status detector means for establishing either a first positive threshold voltage having a value less than +V or a second negative threshold voltage having a value greater than −V, in accordance with the status of the one end being on-hook or off-hook, respectively; and comparator means for comparing said current-to-voltage converter control voltage with the established threshold voltage, said comparator means being coupled with said output circuit means and causing the same to apply onto the other of the E and M leads of the one end signaling circuit a signal having said first state when said control voltage value is greater than, and a signal having said second state when said control voltage value is less than, the established threshold voltage.

13. A DX circuit as in claim 12, including rate of change sensing means coupled with said current-to-voltage converter and said output circuit means for sensing positive and negative going transitions of said control voltage and for causing said output circuit means, in response to a positive going transition of said control voltage, to apply onto the other of the E and M leads of the one end signaling circuit a signal having said first state, before said control voltage reaches a value greater than the established threshold voltage, and for causing said output circuit means, in response to a negative going transition of said control voltage, to apply onto the other of the E and M leads of the one end signaling circuit a signal having said second state, before said control voltage reaches a value less than the established threshold voltage.

14. A DX circuit as in claim 13, including inhibit means coupled with said status detector means and said output circuit means for preventing said output circuit means from changing the state of the signal on the other of the E and M leads of the one end signaling circuit in response to said rate of change sensing means sensing transitions in said current-to-voltage converter control voltage caused by changes in the voltage generated by said status detector means.

15. A method of converting E and M signaling on E and M leads to DX signaling on a pair of leads at one end of a DX signaling link, and vice versa, wherein DX signals are introduced onto a distant end of the DX signaling link in response to E and M signaling at the distant end, said method comprising the steps of detecting the status of a signal on one of the E and M leads at the one end of the signaling link; applying across the pair of signaling link leads a voltage having a value in accordance with the detected status of the signal; sensing the magnitudes and polarities of current flows on the pair of signaling link leads; generating a control voltage having a value in accordance with the difference between the current flows; and applying onto the other of the E and M leads at the one end of the signaling link a signal having a value in accordance with the value of the control voltage and the status of the signal on the one of the E and M leads at the one end of the signaling link.

16. A method of converting E and M signaling on E and M leads of a signaling circuit to DX signaling on a pair of leads at one end of a DX signaling link, and vice versa, wherein DX signals are introduced onto a distant end of the DX signaling link in response to E and M signaling at the distant end, said method comprising the steps of detecting the on-hook/off-hook status of the one end signaling circuit as indicated by the status of a signal on one of the E and M leads of the one end signaling circuit; applying a first or a second voltage across the pair of signaling link leads in accordance with the status of the signal indicating off-hook or on-hook, respectively; sensing the magnitudes and polarities of current flows on the pair of signaling link leads; generating a control voltage, having a value of V, greater than V ($>$V) or less than V ($<$V) in accordance with the difference between the sensed current flows; determining, in accordance with the status of the signal and the value of the control voltage, the on-hook/off-hook status of a signaling circuit at the distant end; and applying onto the other of the E and M leads of the one end signaling circuit a signal having a first or second state in accordance with the determined status of the distant end signaling circuit being off-hook or on-hook, respectively.

17. A method as in claim 16, including th steps of establishing a first threshold voltage having a value greater than V but less than $>$V when the status of the signal on the one of the E and M leads of the one end signaling circuit indicates that the one end signaling circuit is on-hook; establishing a second threshold voltage having a value less than V but grater than $<$V when the status of the signal on the one of the E and M leads of the one end signaling circuit indicates that the one end signaling circuit is off-hook; comparing the value of the control voltage with the established threshold voltage; and controlling said step of applying onto the other of the E and M leads of the one end signaling circuit to apply onto the other of the E and M leads of the one end signaling circuit a signal having the first state when the control voltage is greater than the established threshold voltage, and a signal having the second state when the control voltage is less than the established threshold voltage.

18. A method as in claim 17, including the steps of sensing positive and negative going transitions of the control voltage; and controlling said step of applying onto the other of the E and M leads of the one end signaling circuit, in response to a positive going transition of the control voltage and before the control voltage reaches a value greater than the established threshold voltage, a signal having the first state, and to substantially immediately apply onto the other of the E and M leads of the one end signaling circuit, in response to a negative going transition of the control voltage and before the control voltage reaches a value less than the established threshold voltage, a signal having the second state.

19. A method as in claim 18, including the step of inhibiting a change in the state of the signal applied onto the other of the E and M leads of the one end signaling circuit in response to a transition in the control voltage caused by a change in the status of the signal on the one of the E and M leads of the one end signaling circuit.

* * * * *